United States Patent [19]
Deki et al.

[11] Patent Number: 5,311,527
[45] Date of Patent: May 10, 1994

[54] METHOD FOR AUTOMATICALLY ADJUSTING THE OPTICAL AXIS OF A LASER RESONATOR

[75] Inventors: Kyoichi Deki, Kakogawa; Shinji Sugioka, Takasago; Hiroshige Hata, Himeiji, all of Japan

[73] Assignee: Ushio Denki Kabushiki Kaisha, Japan

[21] Appl. No.: 864,527

[22] Filed: Apr. 7, 1992

[30] Foreign Application Priority Data

Apr. 16, 1991 [JP] Japan ................................. 3-109592
Jun. 11, 1991 [JP] Japan ................................. 3-165241

[51] Int. Cl.$^5$ ................................................ H01S 3/13
[52] U.S. Cl. ...................................... 372/33; 372/31; 372/107
[58] Field of Search ............... 372/107, 29, 31, 33; 359/873, 872

[56] References Cited

U.S. PATENT DOCUMENTS 3,897,139  7/1975  Caruolo et al. ................... 359/873
5,121,405  6/1992  Negus ............................... 372/107

FOREIGN PATENT DOCUMENTS 35579  2/1991  Japan .

OTHER PUBLICATIONS

Akitt et al., "Electronic Mode and Power Control of a High-Power $CO_2$ Laser", *IEEE Journal of Quantum Electronics*, vol. 26, No. 8, Aug. 1990, pp. 1413–1417.

Anderson, "Alignment of Resonant Optical Cavities", *Applied Optics*, vol. 23, No. 17, Sep. 1, 1984, pp. 2944–2949.

*Primary Examiner*—James W. Davie
*Attorney, Agent, or Firm*—Peter L. Michaelson; Raymond R. Moser, Jr.

[57] ABSTRACT

A method for automatically adjusting an optical axis of a laser resonator. Specifically, the angle of a mirror in a laser resonator is changed in a very small stepwise increments, and the laser output before the very little change is compared to the laser output after the incremental change. If the laser output after the very small incremental change is larger than the laser output before the very small incremental change, the angle is automatically changed by a very small amount in the same direction as the previous increment. If the laser output after the very small incremental change is smaller than the previous laser output measurement, the angle is automatically changed by a very small amount in the opposite direction. Thus the optical axis of the laser resonator is adjusted automatically.

3 Claims, 7 Drawing Sheets

METHOD FOR AUTOMATICALLY ADJUSTING THE OPTICAL AXIS OF A LASER RESONATOR

BACKGROUND OF THE INVENTION

1. Field of the Invention

The invention is related to a method for automatically adjusting an optical axis of a laser resonator.

2. Description of the Prior Art

In recent years, the fields in which lasers are applied have been expanding dramatically. Among these lasers, the helium-cadmium or He-Cd laser (main oscillation wave length: 325 nm) is expected to be used in various fields such as: a source of light to expose photo-resist resin, a source of light to cure photo-curing resin when models and metallic molds are designed by means of the photo-curing resin, a source of light to cure photo-curing resin when models of human frames and bones are made using the data of computed tomography, a source of light for the fluorometric analysis, and so on.

The mirrors in a laser resonator, except the He-Ne laser of the small internal mirror type and a semiconductor laser device, are usually held by three or four rods each having a small coefficient of thermal expansion, such as an iron alloy (Fe 64% . Ni 36%). The optical axis of the mirrors is designed to be kept stable by these rods.

The optical axis of such mirrors changes, however, because a temperature gradient is produced by heat generated inside a laser head when the laser equipment is activated and the residual strain of the laser resonator changes with the passage of time. This change of the optical axis of the mirror leads to variations in laser output, subsequently causing a variety of problems. Furthermore, the laser action must be stopped for some time in order to re-adjust the optical axis.

At present, mirror angle adjustment is made manually by means of the following equipment. Namely, a fixed plate is fixed to the rods. The mirror is fixed to a movable plate which is pulled to the fixed plate by a tension coil spring. Further, adjustment bolts for the mirror angle are screwed in, for example, at two corner parts of the movable plate, and the ends of the bolts are put in contact with the fixed plate. The leakage beam from the reflection mirror of the laser or the output beam and so on are separated into spectral components and detected. While the change of the detection intensity is monitored, the adjustment bolts for the mirror angle are manually screwed to maximize the output intensity of the laser. In this regard, see U.S. Pat. No. 3,897,139 issued to Caruolo et al.

However, the above-mentioned method of manual adjustment takes an inordinate amount of time to properly adjust the mirror angle to maximize the output of the laser. Even after the output of the laser is adjusted properly, the mirror angle changes from the optimal value in a short time, hence requiring repeated cumbersome adjustment operations. This is both disadvantageous and inconvenient.

On the other hand, in recent years piezo-actuators and linear actuators operated by means of direct current (DC) motors have been miniaturized and are available with high performance capabilities. Therefore, these actuators have been considered for application in lasers to automatically adjust the mirror angle.

Under the present conditions, however, the adjustment of the mirror angle by means of these actuators is only a technique at a laboratory level, and no practical and economical methods have been established.

Namely, in Japanese Laid-Open Patent Publication Number 3-35579 (1991), a technique is disclosed which converts an analog signal of a laser beam for the measurement into a digital signal by means of an analog-to-digital converter, compares the successive digital signals with each other by means of a program stored in a Read-Only memory, and detects and adjusts the maximal power. However, this technique requires an expensive analog-to-digital converter, a micro-computer and software. While it may be possible to use this technique in conjunction with expensive laser equipment, such as carbon dioxide gas laser equipment, it is not an economical solution for use with ordinary popular laser equipment because of the high cost of the associated equipment used in this technique given the performance that will result therefrom.

SUMMARY OF THE INVENTION

Therefore, the purpose of this invention is to provide a practical method to permit the optical axis of a laser resonator to be automatically adjusted simply and economically.

To achieve this purpose, the inventive method of automatically adjusting the optical axis of a laser resonator has the following distinguishing characteristics: the angle of the mirror in the laser resonator is changed in very small stepwise increments, and the laser output before the incremental change is compared to the laser output after the incremental change. If the laser output after a single step of incremental change is larger than the laser output before this incremental change, the angle is changed automatically in an incremental step in the same direction; if smaller, the angle is incrementally changed in the opposite direction. Accordingly, the angle of the mirror is always automatically controlled in the direction of the maximal output of the laser.

BRIEF DESCRIPTION OF THE DRAWINGS

The teachings of our present invention may be clearly understood by considering the following detailed description in conjunction with the accompanying drawings, in which.

DETAILED DESCRIPTION

Figure 1:
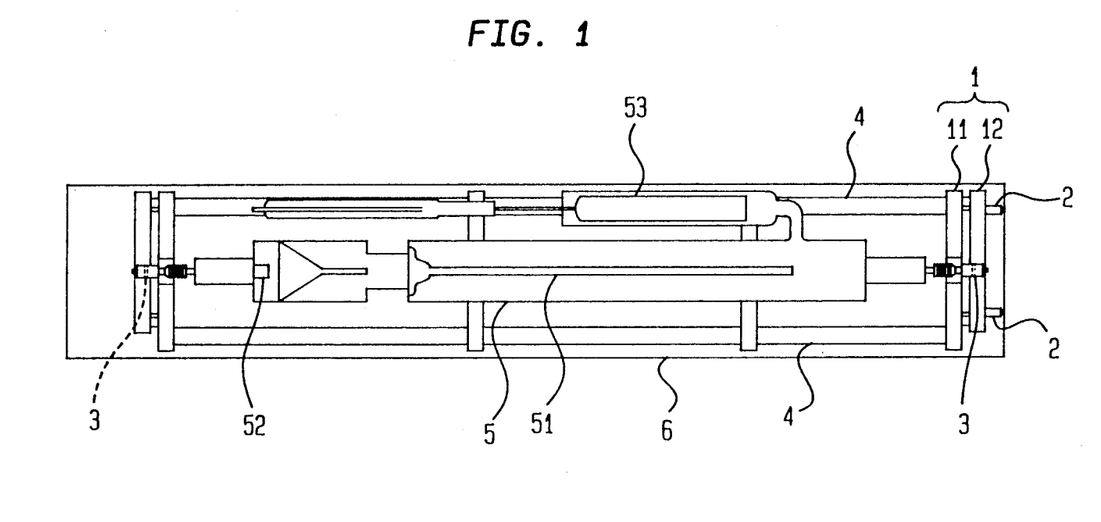
FIG. 1 depicts a skeleton figure for an illustrative embodiment, the whole He-Cd laser head to which our inventive method is applicable.

FIG. 1 is a skeleton figure of the whole He-Cd laser head and which consists of mirror holder 1, actuators 2, a pair of mirrors 3, rods 4 made of an iron alloy, laser tube 5, and case 6. Here, mirror holder 1 consists of fixed plate 11 which is fixed to rods 4, and of movable plate 12 to which mirror 3 is attached. A laser resonator consists of rods 4 and an adjustment mechanism for the mirror angle; the latter includes a pair of mirrors 3, mirror holder 1, and actuators 2. Further, discharge capillary tube 51, anode 52, cathode 53, and so on are arranged in laser tube 5.

Actuators 2 are used to change the angle of a mirror in the laser resonator in very small stepwise increments.

Figure 2:
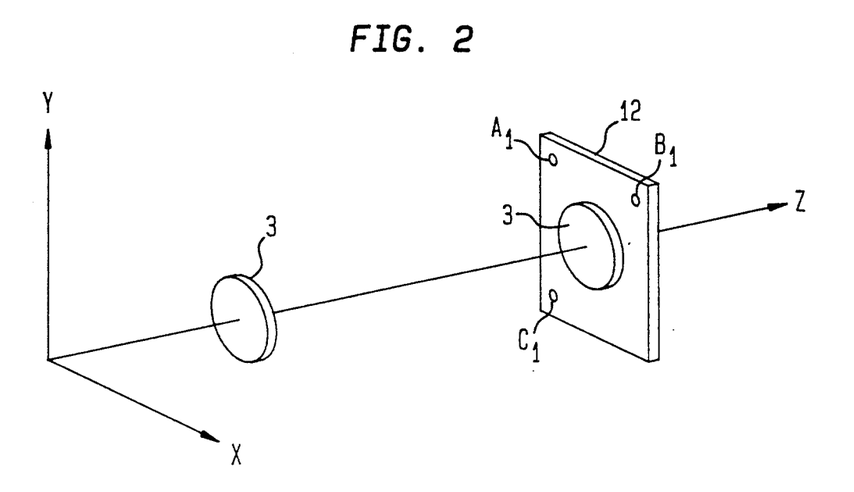
FIG. 2 depicts a three-dimensional figure for the preferred embodiment shown in FIG. 1 and specifically showing the mounting position of an actuator.

In one embodiment of the mounting position of actuators 2, as illustrated in FIG. 2, to change the angle of mirror 3, in reference to a plane XY that is perpendicular to the predetermined optical axis Z, using a corner part $A_1$ of movable plate 12 as a supporting point, actuators 2 are attached to corner parts $B_1$ and $C_1$ next to $A_1$, respectively.

Figure 3:
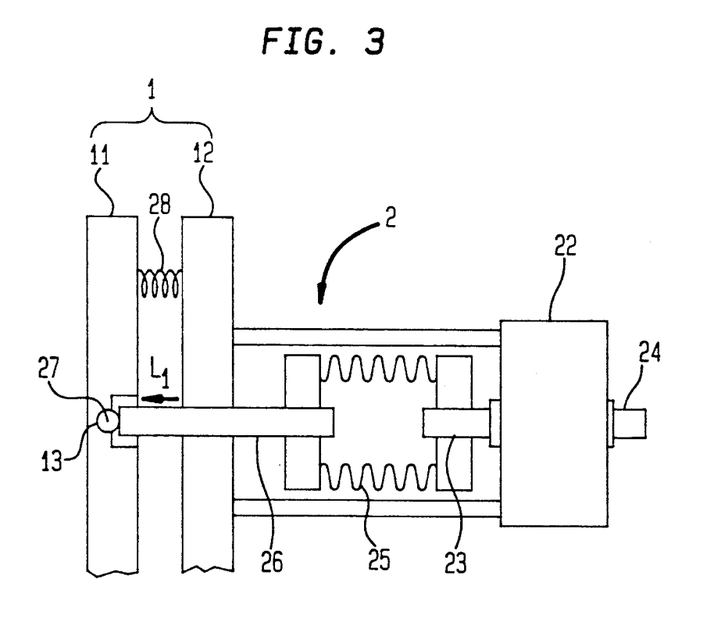
FIG. 3 depicts an enlarged figure for an illustrative embodiment of an actuator.

In one particular example, as is shown in FIG. 3 in enlargement, actuator 2 has stepping motor 22 situated within. Rotation shaft 23 of stepping motor 22 has an exposed end 24 outside of the motor 22. The angle of mirror 3 may be roughly adjusted by manually rotating exposed end 24.

In FIG. 3, 25 is a flexible coupling consisting of bellows, 26 is a moving shaft, 27 is a ball, 28 is a tension coil spring, 11 is the fixed plate in mirror holder 1, and 12 is the movable plate in the mirror holder.

Actuator 2 is fixed to movable plate 12. Rotation shaft 23 of stepping motor 22 is connected to moving shaft 26 by means of the flexible coupling 25. Moving shaft 26 is threaded and screwed into a threaded perforation of movable plate 12. Concavity 13 is formed on fixed plate 11. Ball 27 is arranged in concavity 13 as a cushioning material. Movable plate 12 and fixed plate 11 pull against each other by tension coil spring 28 so that the end of moving shaft 26 and ball 27 are always in contact.

Therefore, when rotation shaft 23 of the stepping motor 22 rotates, moving shaft 26 is rotated via flexible coupling 25. Because of the thread on moving shaft 26, moving shaft 26 advances or recedes. For example, if moving shaft 26 advances (in the direction of the arrow $L_1$ in FIG. 3) and flexible coupling 25 is drawn out, because of the reaction against ball 27, the corresponding corner part on movable plate 12 moves away from fixed plate 11 against tension coil spring 28. Inversely, if moving shaft 26 rotates and recedes, the corresponding corner part on movable plate 12 moves towards fixed plate 11 by the force of tension coil spring 28.

Figure 4:
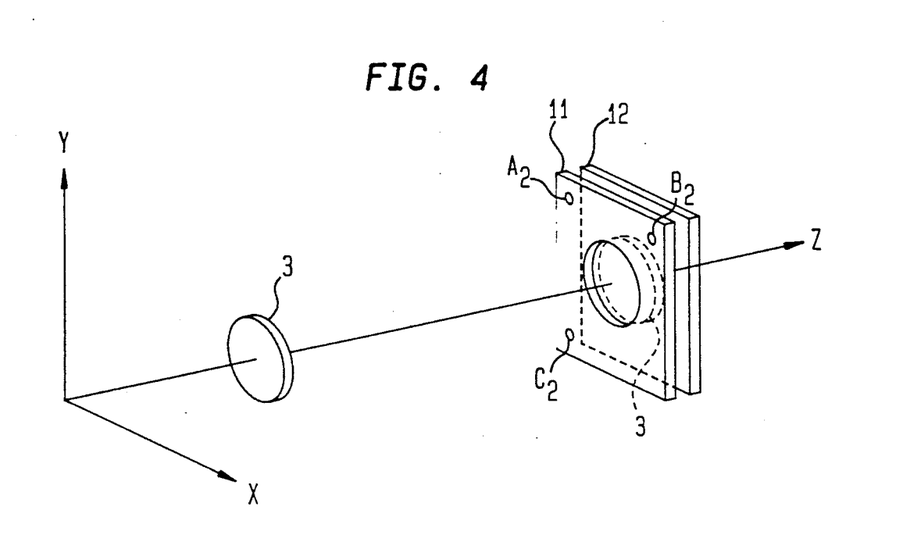
FIG. 4 depicts a three-dimensional figure for another illustrative embodiment of our invention showing the mounting position of an actuator.

As another illustration of the position of actuators 2, as shown in FIG. 4, to change the angle of mirror 3 in reference to a plane XY perpendicular to the predetermined optical axis Z, using a corner part $A_2$ of fixed plate 11 as a supporting point, actuators 2 may be attached to the corner parts $B_2$ and $C_2$ next to $A_2$, respectively.

Figure 5:
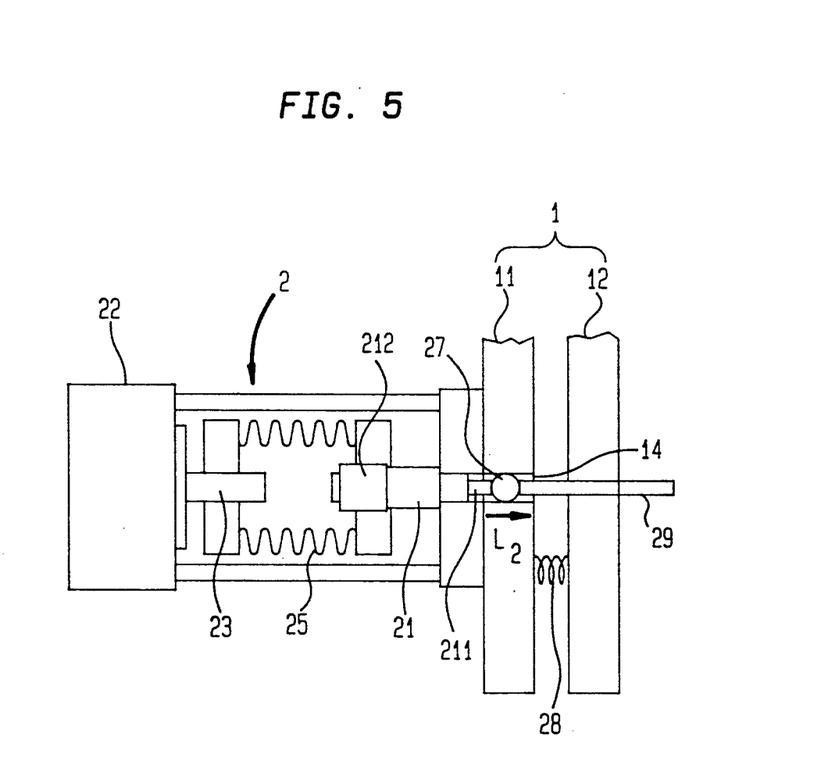
FIG. 5 depicts another illustrative embodiment of an actuator.

In one particular example, as is shown in FIG. 5 in enlargement, actuator 2 has stepping motor 22 situated within. Rotation shaft 23 of stepping motor 22 is connected, via flexible coupling 25 consisting of bellows, to precision screw 21 to adjust displacement which is similar to the adjustment screw used for a micrometer. Moving part 211 of precision screw 21 is inserted into perforation 14 of fixed plate 11, and is free to move back and forth. Ball 27 is arranged and moves freely in perforation 14 as a cushioning material between moving part 211 and screw 29. Screw 29 for manual adjustment is screwed into a threaded perforation of movable plate 12. An end of screw 29 is inserted into perforation 14. Fixed plate 11 and movable plate 12 pull against each other by the force of tension coil spring 28. Screw 29 is always pushing moving part 211, via ball 27, by virtue of the force supplied by tension coil spring 28.

Therefore, screw 29 for manual adjustment is first adjusted roughly. When rotation shaft 23 of stepping motor 22 rotates, rotation part 212 of precision screw 21 is rotated by flexible coupling 25, causing moving part 211 to advance or recede. For example, if moving part 211 advances (in the direction of the arrow $L_2$ in FIG. 5), screw 29 for manual adjustment is pushed by ball 27. The corresponding corner part on movable plate 12 moves away from fixed plate 11 against tension coil spring 28. Inversely, if moving part 211 recedes, the corresponding corner part on movable plate 12 moves towards fixed plate 11 due to the force of tension coil spring 28.

Figure 6:
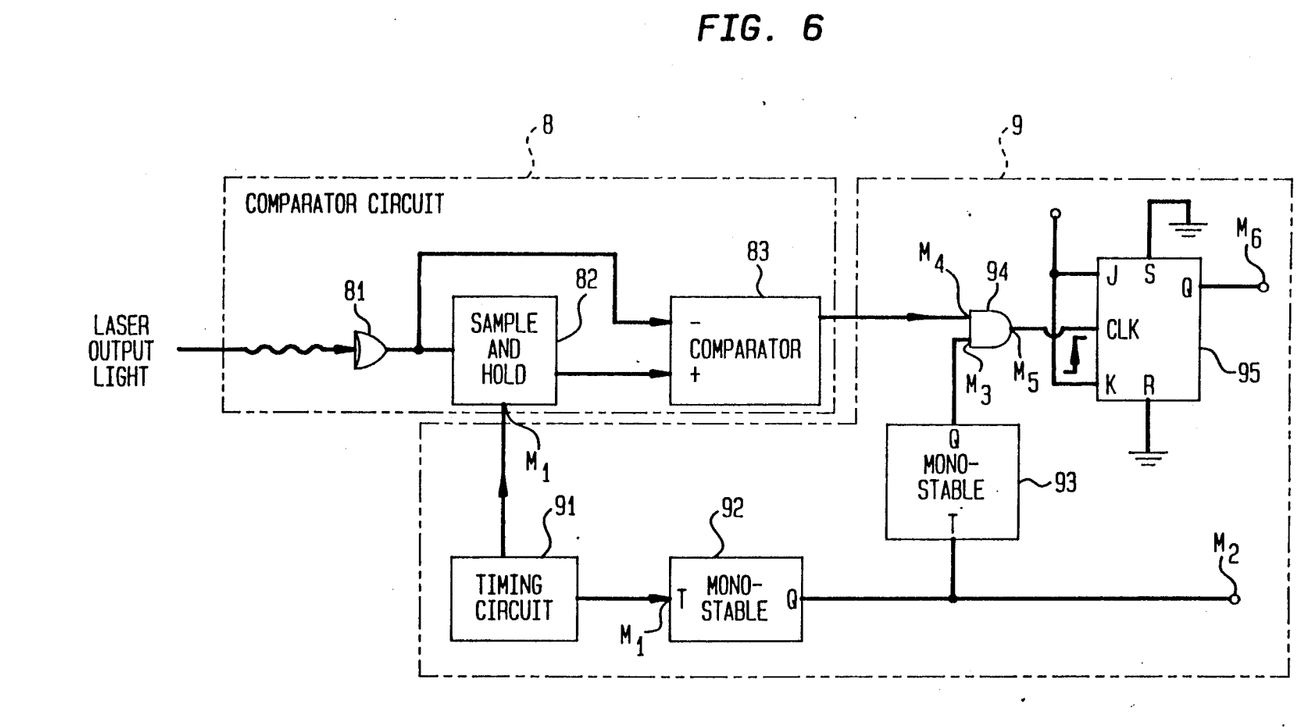
FIG. 6 depicts a block diagram for an actuator driving circuit.
Figure 7:
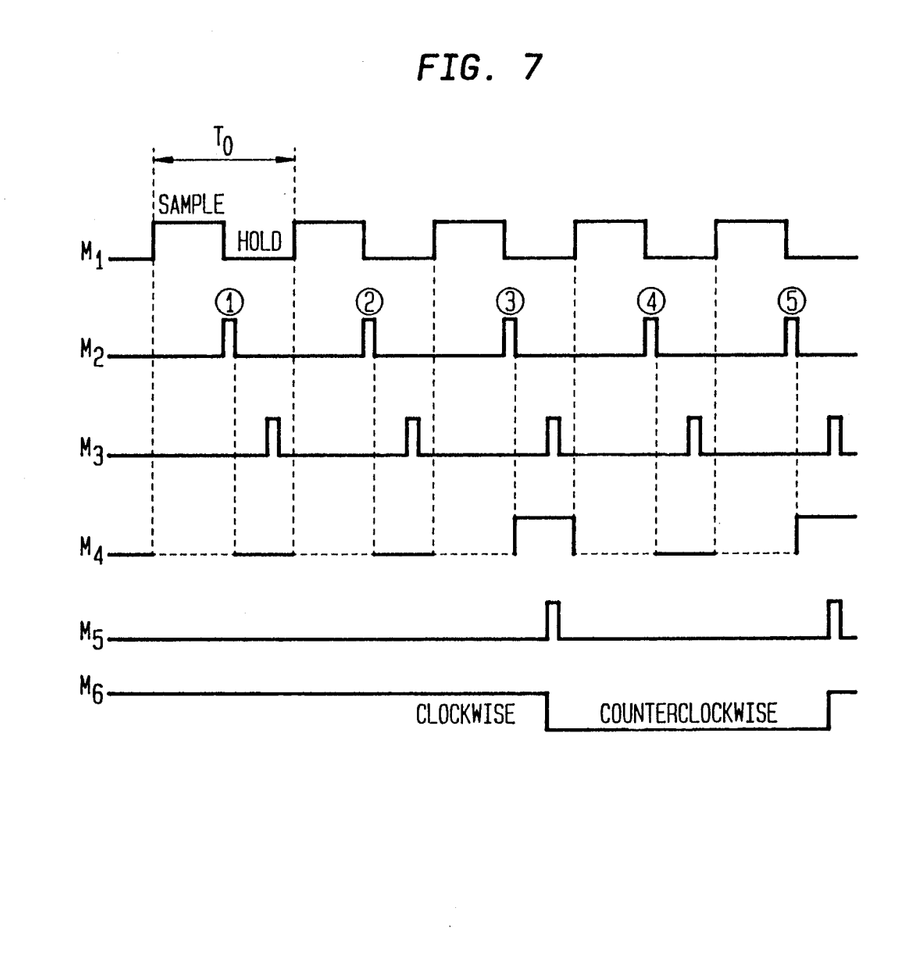
FIG. 7 depicts a timing diagram for the driving circuit shown in FIG. 6.

FIG. 6 shows the block diagram of a driving circuit for automatically controlling actuator 2. Here 8 is a comparison circuit, and 9 is a control circuit. FIG. 7 shows timing diagram for the driving circuit.

Comparison circuit 8 compares the laser output before the very small stepwise incremental change of the mirror angle to the laser output after the incremental change. Control circuit 9 controls the mirror angle by very small increments. In accordance with its control function, if the measured laser output is larger than the laser output prior to the previous incremental step, the mirror angle is changed in the same direction as the previous increment. Alternatively, if the measured laser output is less than the laser output prior to the previous incremental step, the mirror angle is changed in the opposite direction as the previous increment.

In comparison circuit 8, 81 is a photo detector and amplifier to detect the laser output, 82 is a sample-and-hold circuit to hold the laser output immediately before the small incremental change in mirror angle, and 83 is a comparator to compare the laser output before the incremental change to the laser output after the incremental change.

The laser output immediately before the start of stepping motor 22 is detected by photo detector and amplifier 81 and is held in advance by sample-and-hold circuit 82.

While signal $M_1$ is the hold signal, the output signal from sample-and-hold circuit 82 is the signal held and is the input to the non-inverted input terminal of comparator 83.

The laser output immediately after the start of stepping motor 22 is detected by photo detector and amplifier 81, and is directly inputted to the inverted input terminal of comparator 83. By means of these signals which have been inputted to the non-inverted input terminal and the inverted input terminal of comparator 83, the laser outputs before and after the motor movement are compared.

In control circuit 9, 91 is a timing circuit, 92 is a mono-stable multivibrator, 93 is another mono-stable multivibrator, 94 is an AND circuit, and 95 is a toggle flip-flop circuit.

In control circuit 9, the output signal, $M_2$, of the mono-stable multivibrator 92 is used as the drive signal for the motor, and the output signal, $M_6$, of the toggle flip-flop circuit 95 is used as the signal to indicate the direction of the change of the very small incremental step. Here, in this implementation example, the input to the J and K terminals of toggle flip-flop circuit 95 is high and output signal $M_6$ is high. When the rising edge of the wave form of signal $M_5$ is fed to the CLK input terminal, the output signal of $M_6$ is to be inverted to low.

Rotation shaft 23 of stepping motor 22 in actuator 2 is driven in either a clockwise or counterclockwise direction by motor drive signal $M_2$ from the mono-stable multivibrator 92 and by signal $M_6$ indicating the direction from toggle flip-flop circuit 95.

Specifically, the output signal, $M_1$, from timing circuit 91 is a square wave form as is shown in FIG. 7. Receiving the falling edge of the wave form of signal $M_1$ to the hold signal, the laser output is held. Further, this output signal $M_1$ is also used as an input to the mono-stable multivibrator 92. Receiving the falling edge of the wave form of the signal $M_1$, the drive signal $M_2$ for the motor is outputted. Namely, since the falling edge of the wave form of signal $M_1$ becomes the signal to hold the laser output and the drive signal for the motor, the laser output immediately before the start of stepping motor 22 is held, and then stepping motor 22 is driven by drive signal $M_2$.

Here, if the laser output after the movement is low, the output signal, $M_4$, of comparator 83 is of a high level. This high-level signal is fed to toggle flip-flop circuit 95 at the timing of the output signal, $M_3$, of mono-stable multivibrator 93. Therefore, the output of toggle flip-flop circuit 95, namely direction signal $M_6$, is inverted by the output signal, $M_5$, from AND circuit 94, and the signal directing the inversion of the rotation is sent to stepping motor 22.

Figure 8:
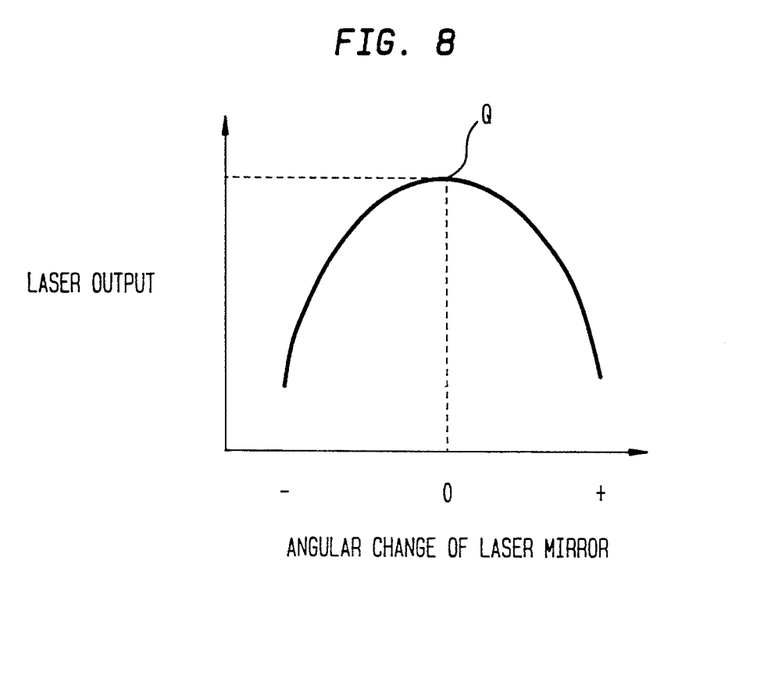
FIG. 8 depicts a graph showing the relation between the angle change of the mirror and the laser output.

The detail of the actual control is explained as follows. For example, if there is difference of elongation due to the temperature variation between rods 4, movable plate 12 moves out of plane XY. This causes a change in the angle of mirror 3 fixed to movable plate 12. If the angle of the mirror 3 changes, as is shown in FIG. 8, the laser output changes. In this FIG. 8, the point O indicates the angle of the mirror 3 corresponding to maximal point Q of the laser output; namely this angle is the optimal angle.

Figure 9:
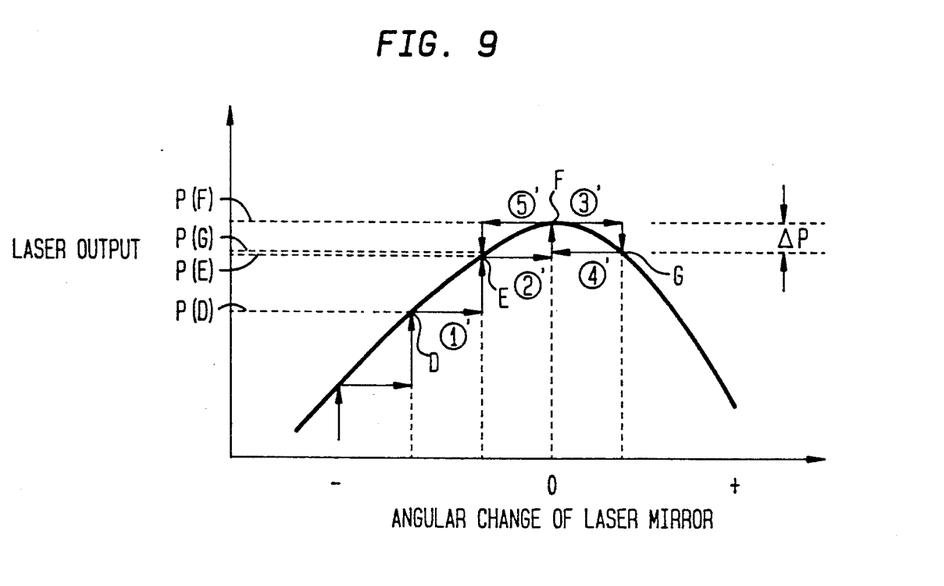
FIG. 9 depicts a graph showing the relation between the angle change of the mirror and the laser output at the control status.

The actual control status will be explained using FIG. 9. In FIG. 9, the arrows and the line segments indicated by ①' through ⑤' show the direction and the magnitude of the change of the mirror angle corresponding to ① through ⑤ of the drive signals for motor control signal $M_2$ in FIG. 7. Typically, each incremental angle change is approximately 30 micro radians.

At an arbitrary point in time, for example, as is shown in FIG. 9, the angle of mirror 3 is at point D, away from optimal point F. The laser output P(D) at this point is held by sample-and-hold circuit 82. Then the angle of mirror 3 is changed one step in a very small increment by one actuator 2. If the direction of the change is indicated by an arrow on the line segment ①', the change of the angle is shown as the line segment ①'. The new angle of the mirror 3 corresponds to point E, and the laser output becomes P(E). At this point in time, the laser output P(D) before the very small, one-step change and the laser output P(E) after the very small, one-step change are compared by comparator 83. If the present laser output P(E) is greater than the previous laser output P(D), the direction of the rotation of the stepping motor 22 for the actuator 2 is maintained, and the next small incremental change of mirror angle is made in the same direction as the previous step.

On the other hand, if the angle of the mirror 3 changes from a point F to a point G, the laser output P(G) after the very small, one-step change is smaller than the laser output P(F) before the one-step change. Consequently, the direction of the rotation of stepping motor 22 for actuator 2 is reversed, and the next change is made in a very small increment in the opposite direction of the previous step.

By repeating such a change in the very small stepwise increments, for example, with a period $T_0$ shown in FIG. 7, the angle of mirror 3 is adjusted to keep the laser output always near the maximal point P(F) within a scope of the resolution of comparison circuit 8.

By the above-stated procedural steps, the automatic adjustment for the angle of mirror 3 by one actuator 2 is finished in one direction, namely in the direction of the rotation around the axis which connects the supporting point $A_1$ or $A_2$ and the other corner part $C_1$ or $C_2$ in FIG. 2 or FIG. 4. Next, the same steps of procedure are repeated by the other actuator 2 to finish the automatic adjustment for the angle of mirror 3 in another direction, namely in the direction of the rotation around the axis which connects the supporting point $A_1$ or $A_2$ and another corner part $B_1$ or $B_2$ in FIG. 2 or FIG. 4. Thus, the laser output is always kept near the maximum.

In this practical example, the automatic adjustment of the optical axis of the laser resonator does not use the absolute value of the laser output as the control signal. It uses as the control signal, the result of the comparison between the laser outputs before and after the very little change of one step by the actuator 2. Therefore, a change of the absolute value of the laser output due to the deterioration of the laser tube itself and mirror 3 does not essentially affect the adjustment of the angle of mirror 3. This is a beneficial aspect of the invention.

Here, in this practical example, depending on the resolution of comparison circuit 8, the variation of the laser output P remains in principle as is shown in FIG. 9. However, it is possible to reduce this variation $\Delta P$ to the level where it does not cause any practical problem by using comparison circuit 8 with the superior resolution.

Figure 10:
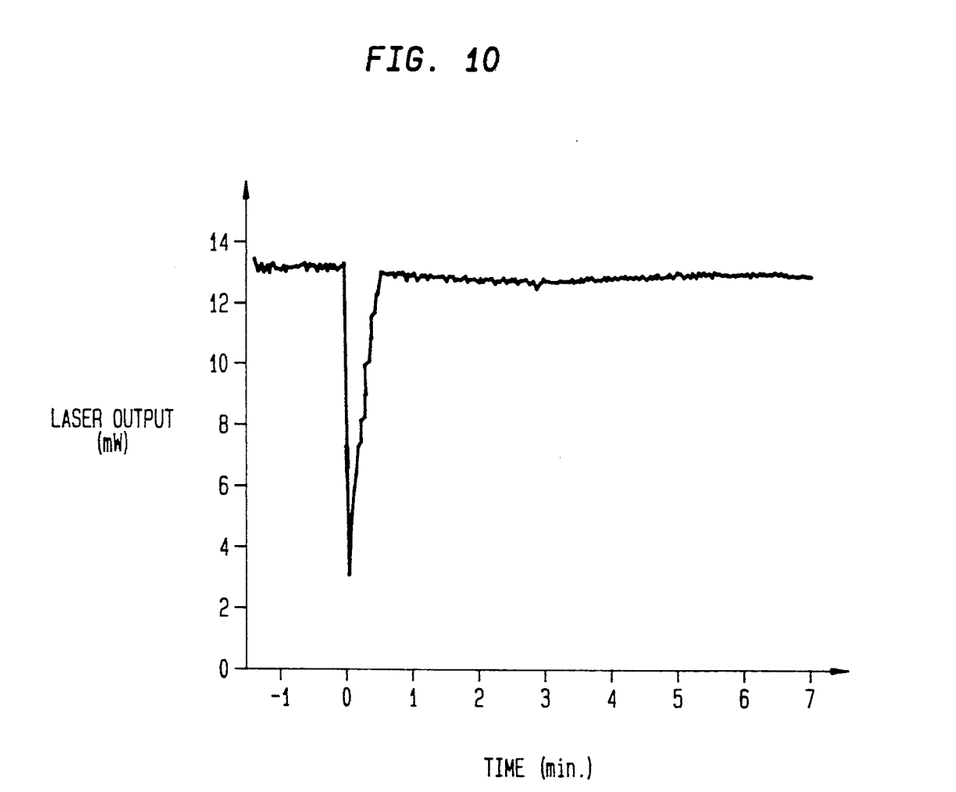
FIG. 10 graphically depicts experimental data obtained through an actual implementation of our inventive method.

The experimental data obtained by the implementation of the method described in this practical example are shown in FIG. 10. It was confirmed that the laser output returned to the maximal value within only 30 sec. or so after the laser output was dropped abruptly by the forced change of the mirror's optical axis.

The practical example of this invention was explained above. In this invention, as for the driving source for the actuators, not only the stepping motors but also DC motors and so on may be used. However, the stepping motors are preferably used, since the magnitude of one step movement of the actuator is always kept constant.

Further, by means of the method of automatic adjustment of the optical axis in accordance with this invention, the stepping motors may always be rotated stepwise in the direction of the increased laser output. Therefore, the adjustment of the optical axis may be made at any time. Namely, even during the use of the laser, the driving circuits for the actuators may be activated to adjust the optical axis. It is even possible to use the laser while the optical axis is adjusted continuously.

As explained above, by this invention, it is possible to adjust automatically the optical axis of a laser resonator practically and economically.

Although various embodiments of the present invention have been shown and described in detail herein, many other varied embodiments that still incorporate the teachings of our invention may be easily constructed by those skilled in the art.

We claim:

1. A method for automatically adjusting an optical axis of a laser resonator which contains a mirror comprising the steps of:

measuring a first output power level for light from said laser resonator;

changing an angle of said first mirror in said laser resonator with respect to said optical axis for a first incremental stepwise amount and in a first direction;

measuring, after said angle is changed a second output power level for light from said laser resonator;

comparing said first and second laser output power levels to one another to determine which output power level is largest;

changing the angle of the mirror automatically by a second incremental stepwise amount and in the first direction if the second laser output power level is larger than the first laser output power level; and changing the angle of the mirror automatically by a second incremental amount in a second direction, said second direction being opposite to the first direction, if the second laser output power level is smaller than the first laser output power level.

2. The method as claimed in claim 1, wherein said laser resonator contains an actuator controlled by both a direction signal and a drive signal.

3. Laser apparatus comprising:

a laser tube having a first mirror at a first end thereof and a second mirror at a second end thereof, an actuator, a fixed plate positioned at said first end of said laser tube and connected to an actuator, a movable plate, connected to said actuator, which supports said first mirror and moves back and forth relative to said fixed plate by virtue plate of said actuator, a measuring circuit for measuring an output power level of light from said laser tube, wherein said measuring circuit produces a first output power level and produces, after the moveable plate is moved, a second output power level, a comparison circuit for comparing said first and second output power levels and for producing a difference signal representing a sign of a difference between said first and second output power levels, and a control circuit for controlling movement of said actuator such that said actuator moves said moveable plate an incremental amount in a first direction after said measuring circuit provides said first output power level and before said measuring circuit provides said second output power level, and said actuator subsequently moves said moveable plate an incremental amount in said first direction if said second output power level is larger than said first output power level and moves said moveable plate an incremental amount in a second direction opposite said first direction if said second output power level is less than said first output power level.

* * * * *